June 18, 1929.      C. E. MAYNARD      1,717,849

TEMPERATURE INDICATING DEVICE FOR CALENDER ROLLS

Filed April 2, 1927

INVENTOR.
Charles Edgar Maynard
BY Edward C. Taylor
ATTORNEY.

Patented June 18, 1929.

1,717,849

UNITED STATES PATENT OFFICE.

CHARLES E. MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS.

TEMPERATURE-INDICATING DEVICE FOR CALENDER ROLLS.

Application filed April 2, 1927. Serial No. 180,400.

This invention relates to a device for holding in active relation to a calender roll the temperature responsive part of a temperature indicating or recording device. It has for its object a device which will cause the temperature indicating mechanism to register accurately the temperature of a calender roll; which will work under uniform conditions; and which will have a sensitive and rapid response to varying temperature conditions of the roll.

Referring to the drawings.

Figure 1:
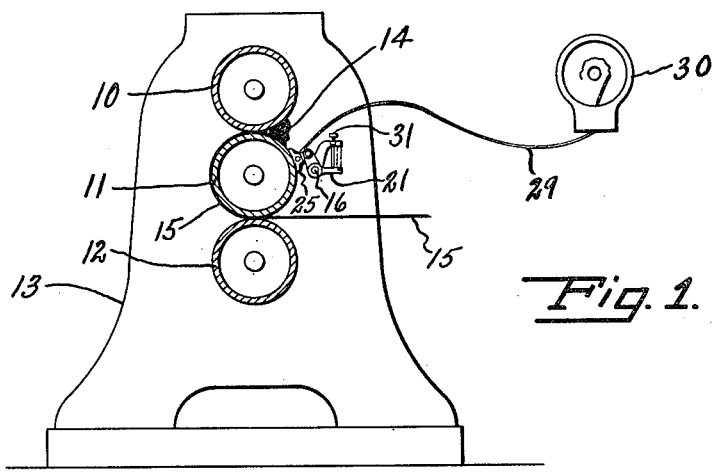
Fig. 1 is a conventional section through a calender to which my invention has been applied.
Figures 2, 3:
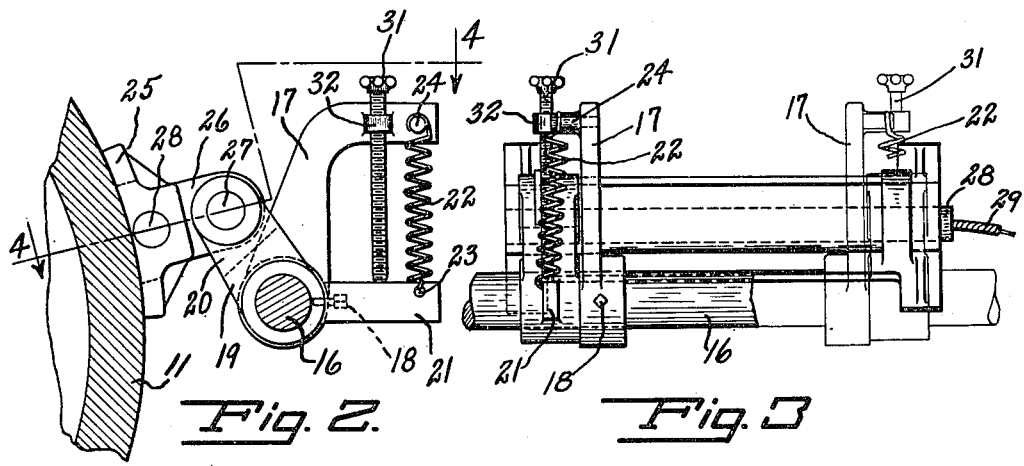
Fig. 2 is an enlarged section through the device for holding the temperature responsive part of the indicating mechanism.
Fig. 3 is a side elevation thereof, part of the mechanism having been shown in phantom in order to show the mechanism in back of it.
Figure 4:
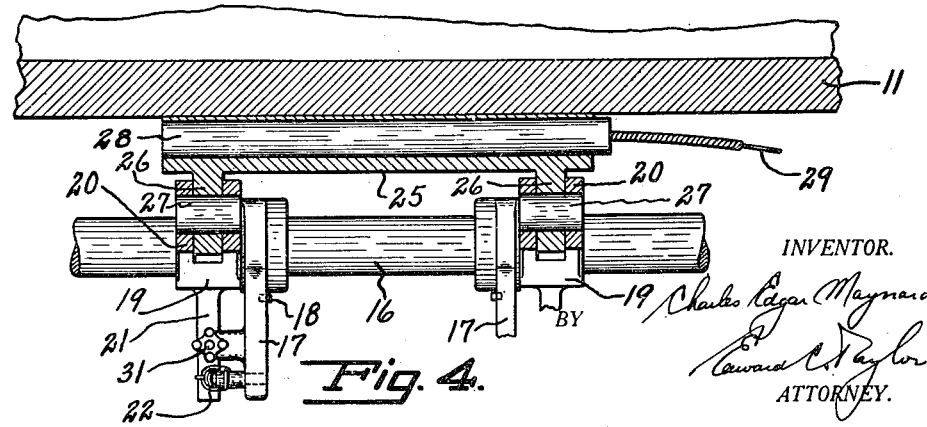
Fig. 4 is a section on line 4—4 of Fig. 2.

I have illustrated my invention as applied to a conventional calender as shown in Fig. 1. This calender is provided with rolls 10, 11, and 12, all mounted in a frame 13 and driven, as is well understood, by gearing which is not reproduced in the drawing. A feed of rubber 14 is placed between two of the rolls and is sheeted out as at 15 between the other two. In the manufacture of rubber products it is of great importance to have uniform temperature conditions on the calender as the temperature of the calender roll exerts a great influence upon the characteristics of the rubber sheet produced by it. Up to the present time temperature indicating or recording devices have been subject to the difficulty that they do not reproduce promptly and accurately the changes of temperature occurring in the calender rolls.

According to my invention, I support the mechanism which carries the temperature responsive device upon a rod 16 secured in the frame 13 of the calender. Arms 17 are set in spaced relation upon this rod by set screws 18. Arms 19 are loosely mounted on the rod and carry at one end yokes 20 and the other end lugs 21. A spring 22 connects each of these lugs with the arms 17, the springs passing through a hole 23 in the lug and being looped over a pin 24 on the arms. A shoe 25, preferably of aluminum or copper, has lugs 26 which are joined by short pivots 27 to the yoke 20. The bulb 28 which forms the temperature responsive device is embedded in the material of the shoe very close to the surface in contact with the calender roll. A connector 29 joins this bulb to any suitable or standard recording instruments 30. A screw 31, threaded through an ear 32 on the arms 17, serves to prevent the lug rising too far and therefore prevents the shoe 25 being pressed by the spring too tightly against the calender roll. The shoe is shaped to conform to the calender roll and is held by the spring in a definite position very slightly spaced from it.

The screws 31 are adjusted so that the shoe 25 is spaced very slightly from the calender roll, being placed about as near to the roll as is possible without generating heat by friction. A preferable way to adjust the screws is to heat the calender to its normal operating temperature, and vary the setting of the screws until the instrument 30 shows the same reading as a standard pyrometer placed in contact with the roll. After this setting is made it will be found that on account of the position, thinness, and rapid conductivity of the shoe, an accurate and practically instantaneous record will be made of any change in the roll's temperature.

Having thus described my invention, I claim:

1. A device for supporting in active relation to a calender roll the temperature responsive part of a recording or indicating instrument, which comprises a shoe containing said temperature responsive part, shaped to conform to the surface of a calender roll, and disposed axially thereof; swinging arms pivotally connected to the shoe and pivoted upon a stationary part of the calender; a spring stretched between the arms and a fixed part of the calender; and an adjustable stop limiting the motion of the shoe towards the calender.

2. A device for supporting, in active relation to a heated roll, the temperature responsive part of a recording or indicating instrument, which comprises a member containing said temperature responsive part, shaped to substantially conform to the surface of the heated roll and positioned just short of contact with said roll.

3. A device for supporting, in active relation to a heated roll, the temperature responsive part of a recording or indicating instrument, which comprises a shoe containing said temperature responsive part shaped to substantially conform to the surface of the heated roll and positioned just short of contact with the heated roll, and adjustable means to yieldingly hold the shoe in such position.

4. A device for supporting, in active relation to a heated roll, the temperature responsive part of a recording or indicating instrument, which comprises a shoe containing said temperature responsive part and shaped to substantially conform to the surface of the heated roll and positioned just short of contact with said roll, a swinging support for the shoe pivotally connected thereto and pivoted on a stationary support and adjustable means to yieldingly hold the shoe in position.

5. A device for supporting, in active relation to a heated roll, the temperature responsive part of a recording or indicating instrument, which comprises a shoe containing said temperature responsive part and shaped to conform to the heated roll; swinging arms pivotally connected to the shoe and pivoted upon a stationary part of the roll support; a spring stretched between the arms and a fixed part of the roll support; and an adjustable stop limiting the motion of the shoe towards the heated roll.

CHARLES E. MAYNARD.